2,863,893

ARSONOSILOXANES AND THEIR PREPARATION

Roland M. Kary, Metuchen, N. J., and Kurt C. Frisch, Wyandotte, Mich., assignors to American Smelting and Refining Company, New York, N. Y., a corporation of New Jersey, and E. F. Houghton and Company, Philadelphia, Pa., a corporation of Pennsylvania No Drawing. Application February 1, 1957
Serial No. 637,845

9 Claims. (Cl. 260—442)

This invention relates to a new and useful class of compounds and method of making same. More particularly, it relates to organosilylarsonates and their preparation. The present compounds possess utility in that they exhibit water repellent and pesticidal properties. Thus, for example, the compounds are useful as such or in a suitable medium, for example in suspension in an aqueous medium, as fungicides. Also, they are useful in impregnating materials such as fabrics and paper to impart thereto either or both water repellent and pesticidal properties.

In accordance with the invention, organosilylarsonates are prepared by agitating a dry halosilane with a dry arsonic acid in a dry inert liquid medium, for example, carbontetrachloride, benzene or other aromatic hydrocarbons, under dry conditions and at temperatures of about 20 to 85° C. Organosilylarsonates having the following general structural formula are prepared by the above reaction:

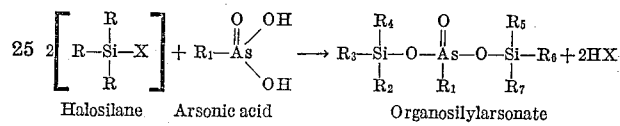

in which Si represents silicon, As represents arsenic, O represents oxygen, $R_7$ is an organic substituent, and $R_1$ through $R_6$ are substituents selected from the group consisting of hydrogen, halogen and organic radicals.

Hydrolysis products of organosilylarsonates are prepared in accordance with the invention by hydrolyzing an organohalosilylarsonate in the presence of water. This may be accomplished by agitating with or without heating an aqueous mixture of the halosilylarsonate. Polymerization accompanies the hydrolysis to produce a polymerized organosilylarsonate. In the preferred hydrolysis procedure, an organohalosilylarsonate is dissolved in an inert liquid which is heavier than and immiscible with water, for example $CCl_4$ or a halobenzene such as chlorobenzene. The solution is then added to a layer of the inert liquid which is contained beneath a layer of an aqueous solution and the mixture is stirred, preferably for at least 20 minutes at about 35-45° C. The resulting polymeric product remains in the inert liquid and is preferably washed therein with water until the wash water is free of chloride. Thereafter the product is recovered from the inert liquid by evaporating the latter therefrom. Linear polymers are prepared by hydrolyzing an organodihalosilylarsonate such as results by reacting a dihaloorganosilane with an arsonic acid. Cross-linked polymers are prepared by the hydrolysis of an organopolyhalosilylarsonate containing more than two replaceable halogen substituents such as results by reacting a polyhalosilane having at least three halogen substituents thereon, with an arsonic acid.

While any halosilane, including any organic halosilane, may be used to prepare the present novel compounds, chlorosilanes in general, and organochlorosilanes in particular, are preferred as the starting material. Likewise organochlorosilylarsonates are preferred to prepare the hydrolysis products and the resulting polymers. Also, any arsonic acid having any desired organic substituent may be reacted with a halosilane to form the corresponding organosilylarsonate. However, it has not been possible to react an arsinic acid (a diorganoarsinic acid), such as dimethylarsinic (cacodylic) acid, with a halosilane.

The present compounds, including those which have been hydrolyzed and polymerized as well as those which have not, exhibit the following basic structure in which a silicon atom and an arsenic atom share a common oxygen atom:

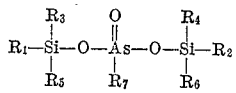

Upon infrared analysis, the compounds exhibit peaks characteristic of siloxy as well as organic arsonoxy compounds. Their structure appears to be established by a reaction which may be illustrated as follows:

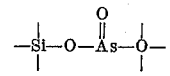

In the above reaction, $R_1$ may be any desired organic radical, for example any aliphatic or aromatic radical and preferably an alkyl, aryl, alkenyl, aralkyl, alkaryl, or heterocyclic aromatic group, for example quinoline. R and $R_2$ to $R_7$ likewise may be any organic radical, for example any aliphatic or aromatic radical and preferably an alkyl, aryl, alkenyl, aralkyl, alkaryl, cyclo aliphatic, or a heterocyclic pentacyclic group—for example a pyrrol, and in addition may also be a hydrogen or a halogen radical, X is a halogen which preferably is chlorine. The reaction between the halosilane and the arsonic acid is accompanied by the evolution of heat and the formation of the corresponding hydrohalic acid.

When, in accordance with the above reaction, a polyhalosilane is reacted with an arsonic acid, an organopolyhalosilylarsonate is produced. Upon hydrolyzing the latter, the corresponding polymer is formed from the resulting hydrolysis product. During the hydrolysis, the halogen is replaced by hydroxyl radicals accompanied by the formation of the corresponding hydrohalic acid. The resulting polyhydroxysilylarsonate in turn forms the polymer accompanied by the formation of water. When an organodihalosilylarsonate is hydrolyzed, linear or cyclic polymerization at the silicon position takes place. Polymers with cross linkages at the silicon position are formed by hydrolyzing an organopolyhalosilylarsonate which has at least two halogen atoms attached to a silicon atom.

If desired, the reaction between the halosilane and the arsonic acid may be conducted in the presence of a scavenger for the hydrohalic acid formed during the reaction. Best results are obtained by using a scavenger where the arsonic acid is a benzyl arsonic acid or a quinoline arsonic acid, including a substituted quinoline arsonic acid and an N-substituted quinoline. For example, increased yields of the organosilylarsonate were obtained in reacting a benzyl or a quinone arsonic acid with a halosilane in the presence of pyridine as a scavenger.

The following specific examples further illustrate the invention. It should be understood, however, that the examples are given for the purpose of illustration and that the invention in its broader aspects is not limited thereto.

EXAMPLE I

*Bis-chlorodimethylsilyl methylarsonate*

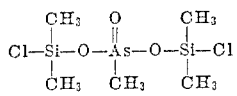

35 grams (0.25 mol) of pure, crystalline methylarsonic acid and 400 cc. of dry benzene were place in a three-necked flask which was fitted with a mercury-sealed stirrer, a water-cooled reflux condenser provided with a drying tube to exclude moisture, and an electric heating mantle. The arsonic acid was suspended in the benzene by rapid stirring.

65 grams (0.5 mol) of dry dimethyldichlorosilane were added dropwise from a separatory funnel to the suspension while rapidly stirring the latter. The temperature of the benzene suspension which was initially at 28° C. rose to 33.5° C. during the addition of the silane.

Upon completion of the addition of the silane, the mixture was refluxed for 24 hours at a temperature of about that of the boiling point of benzene, i. e. about 79–81° C. The entire mixture assumed a straw-yellow color during the refluxing. At the end of the reflux period a small amount of benzene-insoluble material remained which, in the hot solution, collected as liquid drops which were heavier than the benzene. Upon cooling to room temperature the liquid drops solidified into solid globules.

The above solution was filtered at room temperature. The benzene was removed from the filtrate by distillation, first at ordinary and then at reduced pressure. The straw-colored oil product remaining after the benzene removal was found to be soluble in most organic solvents, particularly halogen-containing organic solvents such as carbontetrachloride, perchloroethylene, bromoethane, etc. The calculated and found analysis by weight of this bis-chlorodimethylsilyl methylarsonate product are set forth in Table I.

TABLE I

| | Found, percent | Calculated, percent |
| --- | --- | --- |
| Si | 17.4 | 17.25 |
| As | 25.3 | 23.10 |
| Cl | 16.15 | 21.50 |
| C | 17.80 | 18.45 |
| H | 5.37 | 4.66 |
| O | 17.98 | 15.04 |

The product was also subjected to infrared spectroscopic analysis. It exhibited the peaks characteristic of methylsiloxy compounds as well as peaks characteristic of organic arsonoxy compounds such as methylarsonic acid.

EXAMPLE II

*Bis-dichloromethylsilyl methylarsonate*

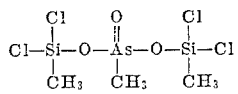

The procedure of Example I was repeated using 35 grams (0.25 mol) of pure methylarsonic acid suspended in 400 cc. dry benzene and 74.8 grams (0.5 mol) of methyltrichlorosilane.

After the refluxing and upon removal of insolubles and the benzene, a greenish, transparent resinous solid brittle mass was obtained. This bis-dichloromethylsilyl methylarsonate product was found to contain 13.25% Si and 18.79% As, as compared to the calculated values of 15.35% Si and 20.45% As.

EXAMPLE III

*Bis-chlorodiphenylsilyl phenylarsonate*

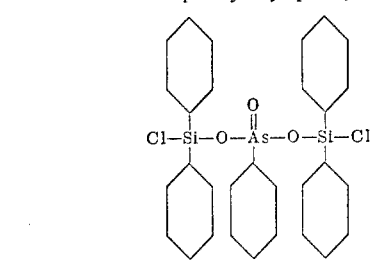

The procedure of Example I was repeated using 20.2 grams of phenylarsonic acid (0.1 mol) suspended in 200 cc. dry benzene and 50.6 grams (0.2 mol) of diphenyldichlorosilane.

After the refluxing and upon removal of insolubles and solvent, a white amorphous solid was recovered. This bis-chlorodiphenysilyl phenylarsonate product was found to contain 11.75% As and 8.55% Si as compared to the calculated values of 11.80% As and 8.84% Si.

EXAMPLE IV

*Bis-dichlorophenylsilylphenylarsonate*

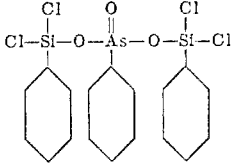

The procedure of Example I was repeated using 20.2 grams of phenylarsonic acid (0.1 mol) suspended in 400 cc. of dry benzene and 42.3 grams of phenyltrichlorosilane (0.2 mol).

After the refluxing and upon removal of insolubles and solvent, a greenish, resinous, transparent solid mass was recovered. This bis-dichlorophenylsilylphenylarsonate product was found to contain 15.97% As and 11.15% Si, as compared to the calculated values 13.55% As and 10.15% Si.

EXAMPLE V

*Bis-triphenylsilylphenylarsonate*

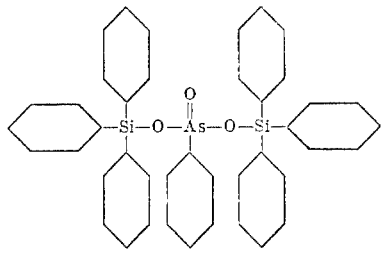

The procedure of Example I was repeated using 20.2 grams phenylarsonic acid (0.1 mol) suspended in 400 cc. of dry benzene to which 79.1 grams (1.0 mol) of pyridine were added as a scavenger for the HCl that was liberated during the reaction of the arsonic acid with the silane. Thereafter, 59.0 grams of triphenylchlorosilane in 400 cc. of dry benzene were added to the above mixture and the resulting mixture was held at reflux for 24 hours at 80–82° C.

After cooling and filtering the refluxed mixture, the pyridine and the benzene were distilled therefrom and a white, waxy, solid product was recovered. This bis-triphenylsilylphenylarsonate product was found to contain 10.33% As and 7.0% Si as compared to the calculated values of 10.42% As and 7.80% Si.

Bis-triphenylsilylmethylarsonate was prepared in the same manner, using 14 grams of methylarsonic acid instead of the phenylarsonic acid.

EXAMPLE VI

*Bis-dichlorophenylethylsilyl benzylarsonate*

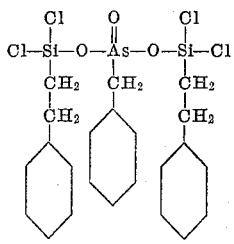

The above product was prepared in accordance with the procedure of Example I using 21.6 grams of benzylarsonic acid (0.1 mol) suspended in 400 cc. of dry benzene to which 15.82 grams of pyridine (0.2 mol) had been added previously as a scavenger. 47 grams of phenylethyltrichlorosilane (0.2 mol) in 400 cc. of dry benzene were added and the mixture refluxed for 24 hours.

After filtering and distilling the benzene and pyridine from the filtrate, a stiff semi-solid product of honey-like consistency and yellow color was recovered.

EXAMPLE VII

*Bis-dichlorophenylethylsilyl methylarsonate*

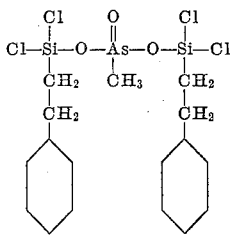

The procedure of Example I was repeated to prepare the above compound, using 35 grams of pure methylarsonic acid (0.25 mol) suspended in 400 cc. of dry benzene containing 0.2 mol of pyridine. 119.8 grams of phenylethyltrichloro-silane (0.5 mol) in 400 cc. of dry benzene were added to the suspension which was then refluxed for 24 hours.

After cooling and filtering the refluxed solution, the benzene and pyridine were distilled therefrom. A stiff, semi-solid product which possessed a honey-like consistency and a light yellow color was recovered.

EXAMPLE VIII

*Bis-dichloroallylsilyl allylarsonate*

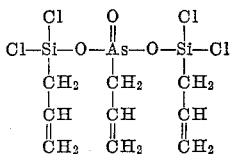

The procedure of Example I was repeated using 10 grams of allylarsonic acid and 21.2 grams of allyltrichlorosilane to prepare the above product. After cooling, filtering and distilling the benzene from the refluxed solution a rubbery solid product was recovered which contained 14.65% As as compared to the theoretical value of 16.85% As for the bis-dichloroallylsilyl allylarsonate.

EXAMPLE IX

*Bis-dichlorocyclohexylsilyl methylarsonate*

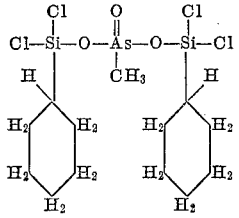

The procedure of Example I was repeated, using 35 grams of methylarsonic acid and 108.8 grams of cyclohexyltrichlorosilane. Upon filtering and removal of the benzene from the filtrate a white solid was recovered which contained 13.9% As as compared to the calculated value of 15.37% As for bis-dichlorocyclohexylsilyl methylarsonate.

EXAMPLE X

*Chloromethylpyrrylsilyl methylarsonate*

Dichloromethylpyrrylsilane as a starting material for the preparation of the above compound was prepared as described in our co-pending application entitled "Pyrrylsilicon Compounds and Their Preparation," Serial No. 539,940, filed October 11, 1955. In accordance with the invention of said application, ethyl-magnesium bromide was prepared by reacting 218 grams of ethyl bromide with 48.6 grams of magnesium filings in 500 cc. of ether. 132 grams of pyrrole dissolved in 150 cc. of ether were gradually added to the resulting ether solution of ethyl-magnesium bromide while cooling the latter. When the addition was completed, the combined solution was allowed to come to room temperature and was then refluxed for 2 hours. At the end of the reflux period, an ether solution of pyrryl-magnesium bromide which possessed a dark green color was obtained.

One-half of the above prepared pyrrylmagnesium bromide solution was gradually added to a solution of 149.5 grams of methyltrichlorosilane in 250 cc. of ether; the rate of addition being controlled so that the exothermic heat of reaction liberated by the formation of the dichloromethylpyrrylsilane was sufficient to maintain a gentle refluxing of the solution during said addition step. Upon completion of the addition of the pyrrylmagnesium bromide solution, the mixture was refluxed for an hour. The refluxed solution was then filtered and the filter residue washed with ether. The ether was then distilled from the filtrate to obtain a product which distilled at 67° C. under a pressure corresponding to a column of 4.8 mm. of Hg. Upon redistillation, the dichloromethylpyrrylsilane distilled at 37° C. under a pressure of 0.25 mm. of Hg and was collected as a colorless liquid.

15.0 grams of the above prepared dichloromethylpyrrylsilane were reacted with 5.85 grams of methylarsonic acid in accordance with the procedure set forth in Example V, using 7.0 grams of pyridine as a scavenger for the hydrochloric acid liberated in the ensuing reaction in the dry benzene. A product was obtained which contained 5.85% arsenic and 30.8% silicon.

EXAMPLE XI

*Methylarsonodimethylsiloxane*

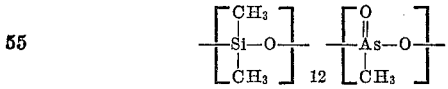

The above polymeric compound was prepared as follows: 10 grams of bis-chlorodimethylsilyl methylarsonate, prepared as set forth in Example I, was added to 100 cc. carbon tetrachloride and dissolved therein by stirring at room temperature. This solution was slowly introduced over a period of about 30 minutes and by means of a separatory funnel, to the carbontetrachloride layer of a mixture consisting of 100 cc. carbon tetrachloride and 300 cc. water. During the addition, the mixture was rapidly stirred and was maintained at a temperature of 35–45° C. by the exothermic heat of reaction supplemented by external heating.

The mixture was then cooled to room temperature. Thereafter the CCl₄ layer was separated from the water layer by means of a separatory funnel and was washed repeatedly with water. The wash water, after being separated from the CCl₄ layer, was added to the initially separated water layer. No methylarsonic acid was detected in the combined aqueous solution, although the solution was found to contain hydrochloric acid.

A colorless, transparent, rubbery and pliable product which was somewhat like bouncing putty was recovered upon distilling the CCl₄ from the washed carbontetrachloride layer. This product was found to be insoluble in water. It was soluble in chloroform, benzene, acetone and other common organic solvents. It exhibited water-repellency characteristic of silicone compounds.

Table II sets forth the composition as determined by chemical analysis and the theoretical average composition indicated by the above formula for methylarsonodimethylsiloxane in which twelve siloxy groups alternate with one arsonoxy group; the silicon atom in two of the siloxy groups sharing a common oxygen atom with the arsenic atom of the arsonoxy group.

TABLE II

|    | Found, percent | Calculated, percent |
|----|----------------|---------------------|
| Si | 33.60          | 33.30               |
| As | 7.67           | 7.40                |
| C  | 29.80          | 29.70               |
| H  | 8.10           | 7.40                |
| O  | 20.13 (balance)| 22.20               |

Infrared spectroscopic analysis of the product showed peaks characteristic of methylsiloxy groups as well as those for organic arsonoxy compounds, such as methylarsonic acid.

EXAMPLE XII

*Methylarsono methylsiloxane*

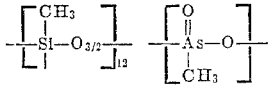

10 grams of bis-dichloromethylsilyl methylarsonate, prepared as described in Example II, were added to water and hydrolyzed by boiling the mixture for about one hour. The white, amorphous, powdery product which was recovered from the hydrolysis step was washed with water until the wash water was free of chloride. The washed as well as the unwashed product exhibited a high degree of water repellency. The chemical analysis and the theoretical (calculated) average composition of the product are set forth in Table III. The found elemental values correspond to the above given polymeric structure for methylarsonomethylsiloxane in which twelve siloxy groups alternate with one arsonoxy group; the silicon atom in two of the siloxy groups sharing a common oxygen atom with the arsenic atom of the arsonoxy group.

TABLE III

|    | Found, percent | Calculated, percent |
|----|----------------|---------------------|
| Si | 37.10          | 36.3                |
| As | 6.75           | 8.1                 |
| C  | 15.80          | 15.5                |
| H  | 4.60           | 3.9                 |
| O  | 35.75          | 36.2                |

EXAMPLE XIII

*Methylarsonoethyl (hydrogen) siloxane*

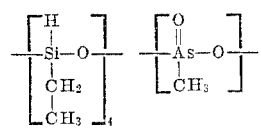

The above polymeric compound was prepared by repeating the procedure of Example I using 14.0 grams (0.1 mol) methylarsonic acid suspended in a solution of 16.7 grams of dry pyridine in 400 cc. of dry carbontetrachloride and 25.8 grams of ethyldichlorosilane (ethyl- hydrogen dichlorosilane). The pyridine was to serve as a hydrogen halide acceptor.

The mixture was stirred without refluxing at room temperature (25° C.) for 24 hours, the evolved heat from the reaction being removed by cooling. The formed precipitate of pyridine hydrochloride and other insoluble byproducts were removed by filtration and the resulting carbon tetrachloride solution of the bis-chloroethyl (hydrogen) silyl methylarsonate was then hydrolyzed according to the procedure of Example XI. The hydrolysis was accomplished in a water-CCl₄ mixture containing 6.7 grams pyridine, the latter to serve as a scavenger.

After the hydrolysis and upon removal of the carbontetrachloride by distillation, a transparent rubbery compound was obtained. It was found to correspond to the aforegiven polymeric structure for methylarsonoethyl (hydrogen) siloxane in which four siloxy groups alternate with one arsonoxy group; the silicon atom in two of the siloxy groups sharing a common oxygen atom with the arsenic atom of the arsonoxy group. It contained 17.0% As and 28.6% Si as compared to the calculated 17.9% As and 26.8% Si.

EXAMPLE XIV

*8-hydroxyquinoline - 5(6) arsonoethyl(hydrogen) siloxane*

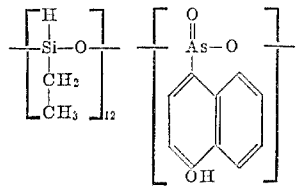

5(6)-arsono-8-hydroxyquinoline N-methylarsonate as a starting material for the preparation of the above compound was prepared as follows: 14.5 grams pure 8-hydroxyquinoline (0.1 mol) was mixed with 14.3 grams ortho-arsenic acid as 9.5 cc. of a 78.3% aqueous concentrate of 1.93 specific gravity. Upon stirring, the mixture first became a dark green syrup which shortly thereafter suddenly solidified into a light green mass accompanied by the evolution of considerable heat. The mass was dissolved in water and was purified by recrystallization therefrom. It was found to contain 27.5% As, 5.6% N, 40.0% C, 3.5% H, which compared to calculated values of 28.0% As, 5.2% N, 40.3% C, 2.6% H₂. 10.6 grams of the thus prepared arsono-8-hydroxyquinoline was then mixed with 6.3 grams pure methylarsonic acid as dry solids in a mortar and subsequently refluxed with absolute methanol. A clear dark green solution was obtained after about two hours of refluxing. The methyl alcohol was removed by distillation. 15.0 grams of a yellow-green solid were recovered, which was found to contain 37.4% As, 4.0% N, 30.7% C, 2.4% H, as compared to calculated values of 36.9% As, 3.4% N, 29.6% C, 2.5% H. This corresponded to a 93% yield of the theoretical 16.2 grams of 5(6)arsono-8-hydroxy quinoline - N - methylarsonate.

4.5 grams of the above arsonoquinoline methylarsonate, suspended by stirring in 100 cc. of a mixture of dry carbontetrachloride and 5 cc. dry pyridine, were reacted with 2.9 grams of ethyldichlorosilane (ethylhydrogen dichlorosilane) in accordance with the procedure of Example XIII was followed to obtain bis-chloroethyl (hydrogen) silyl-8-hydroxyquinoline - (N - methylarsonate)- 5(6)-arsonate. This monomeric compound was then hydrolyzed and polymerized as in Example XIII.

The recovered final product contained 5.8% As, 1.5% N, and 30.3% Si, which corresponds to the calculated values of 6.6% As, 1.2% N, and 29.6% Si in the aforegiven polymeric structure for 8-hydroxyquinoline-5(6) arsonoethyl(hydrogen) siloxane in which twelve siloxy groups alternate with one arsonoxy group; the silicon atom in two of the siloxy groups sharing a common oxygen atom with the arsenic atom of the arsonoxy group.

The following examples illustrate the pesticidal properties of the compounds as inhibitors of fungi growth. In these examples the following solutions were prepared:

A. A 2% solution of methylarsonodimethylsiloxane in carbon tetrachloride.

B. A 2% solution of bis-triphenylsilyl-phenylarsonate in benzene.

C. A 4% solution of bis-triphenylsilylphenylarsonate in benzene.

D. A 2% solution of tetradimethylsiloxane in carbon-tetrachloride.

One cc. of each of the solutions was placed in separate petri dishes and the solvent evaporated to obtain a thin film on the dissolved compound on the bottom of the respective dishes. To each dish and to a blank dish were added 6 cc. of a 0.5% sterile starch solution. The dishes were then exposed to the atmosphere for a period of two weeks, adding sterile water to make up for evaporation. At the end of this period the blank and the dish containing compound D contained numerous colonies of mold. However, no mold was observed in the dish containing compound A while a small amount of mold in greatly reduced colonies and size of colonies appeared in the dishes containing compounds B and C.

The water repellent properties of the compounds are illustrated by the following examples made in accordance with the procedure of "American Association of Textile Chemists and Colorists" (AATCC), entitled "Resistance to Wetting (Spray Test) Standard Test Method 22–52," found in "Technical Manual and Year Book of the American Association of Textile Chemists and Colorists," 1952 edition.

Carbontetrachloride solutions containing by weight 4% of zinc as zinc n-octrate and 2% of the compounds set forth in the following table were prepared. Viscose rayon challis squares, 144 square inches in area, were soaked in each of the solutions and were then passed through a mechanical wringer twice to remove excess solution. The strips were then stretched on a wooden frame and were dried and cured at 300° F. for 10 minutes. The cured strips were then conditioned in a humidity chamber for 3–4 hours at 60% relative humidity and 70° F. The conditioned strips were then placed in a standard frame and subjected to a standard water spray as set forth in the above standard test method number 22–52. The following results were obtained:

| Compound: | Spray rating |
|---|---|
| Methylarsonodimethylsiloxane | 70 |
| Bis-triphenylsilylmethylarsonate | 50 |

In accordance with the test, a spray rating of 100 indicates no wetting, 70% indicates partial wetting of the upper surface but no penetration of the fabric, and 0 indicates complete wetting of both surfaces with complete penetration of water.

This application is a continuation-in-part of our co-pending application Serial No. 539,939, filed October 11, 1955, now abandoned, which application is incorporated herein by reference.

What is claimed is:

1. An organosilylarsonate having the following structure:

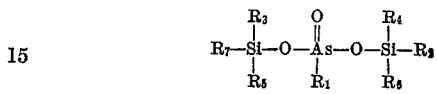

in which Si represents silicon, As represents arsenic, O represents oxygen, $R_1$ is an organic substituent selected from the group consisting of alkyl, aryl, alkenyl, aralkyl, alkaryl, and heterocyclic aromatic radicals, and $R_2$ through $R_7$ are substituents selected from the group consisting of hydrogen, halogen, alkyl, aryl, alkenyl, aralkyl, alkaryl, cycloaliphatic, and heterocyclic pentacyclic radicals.

2. A method of preparing an organosilylarsonate which comprises agitating a dry halosilane with a dry arsonic acid in dry inert liquid medium under dry conditions and at temperatures of about 20 to 85° C. and recovering an organosilylarsonate product from said medium.

3. A method of preparing an organosilylarsonate which comprises reacting a halo-organosilane with a dry arsonic acid in dry benzene under reflux conditions, and recovering an organosilylarsonate product from said benzene after said refluxing step.

4. A method of preparing a polymerized organosilylarsonate which comprises reacting a dry polyhalosilane with a dry arsonic acid in a dry inert liquid medium under dry conditions and a temperature of about 20 to 85° C. thereby forming a monomeric halosilylarsonate, hydrolyzing said monomeric compound in the presence of water thereby hydrolyzing and polymerizing same, and recovering the resulting polymerized product.

5. Bis-chlorodimethylsilyl methylarsonate.
6. Bis-dichloromethylsilyl methylarsonate.
7. Bis-chlorodiphenylsilyl phenylarsonate.
8. Bis-dichlorophenylsilyl phenylarsonate.
9. Bis - chloroethyl(hydrogen)silyl - 8 - hydroxy - quinoline - (N - methylarsonate) - 5(6) - arsonate.

No references cited.